United States Patent [19]
Takada

[11] 3,953,640
[45] Apr. 27, 1976

[54] SELF-SHAPING WOVEN INFLATABLE BELT AND METHOD OF PRODUCTION

[75] Inventor: Juichiro Takada, Tokyo, Japan

[73] Assignee: Takata Kojyo Co., Ltd., Tokyo, Japan

[22] Filed: May 6, 1974

[21] Appl. No.: 467,346

[30] Foreign Application Priority Data
May 9, 1973 Japan.............................. 48-53688

[52] U.S. Cl..................... 428/188; 139/387 R; 180/82 C; 428/257; 428/258; 428/259
[51] Int. Cl.²...................... B32B 3/20; D03D 3/02
[58] Field of Search ............. 161/88, 90, 91, 139; 28/72 R; 139/387 R, 388; 5/348 R; 293/60; 180/82 C; 9/2 A, 11 A; 428/257–259, 188

[56] References Cited
UNITED STATES PATENTS

| | | | |
|---|---|---|---|
| 3,294,605 | 12/1966 | Fisher | 139/387 R |
| 3,669,157 | 6/1972 | Woodall et al. | 28/72 |
| 3,829,353 | 8/1974 | Fisher | 139/387 R |

Primary Examiner—William J. Van Balen
Assistant Examiner—P. J. Thibodeau
Attorney, Agent, or Firm—Wolder & Gross

[57] ABSTRACT

An inflatable hollow belt which is longitudinally self shapeable, includes a woven body having warps on one side of lesser length and greater overall strength than the warps on the other side, and an interwoven weft so that the deflated belt can be compactly collapsed and the inflated belt curves along its length. The belt is produced by weaving the hollow belt with the warps along one side having a relatively high heat shrinkage, and then applying heat to the belt to shrink such warps. The wefts and the longer warps are of sufficient strength to withstand the inflation pressure.

7 Claims, 10 Drawing Figures

U.S. Patent   April 27, 1976   3,953,640
Fig.1.
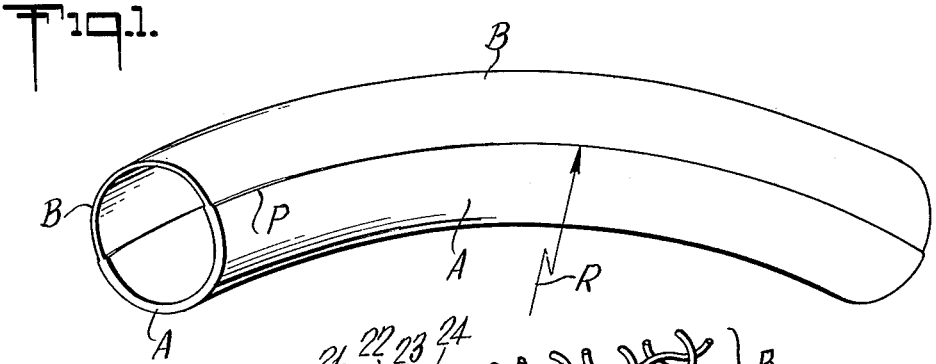
Fig.2.
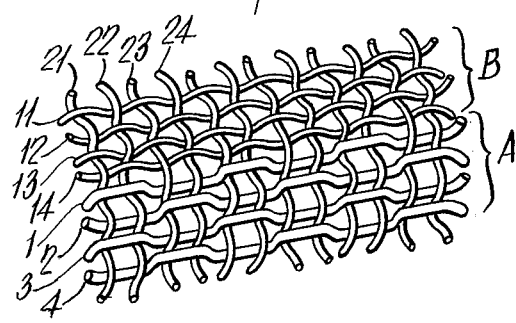
Fig.3.   Fig.5a.  Fig.5b.  Fig.5c.  Fig.5d.
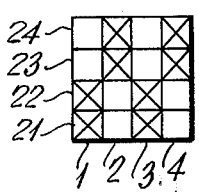 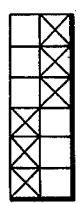 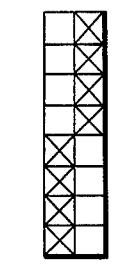 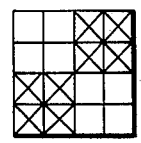 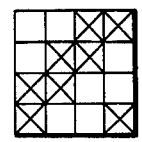
Fig.4.
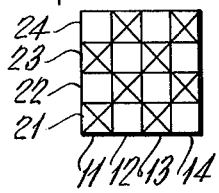
Fig.6.
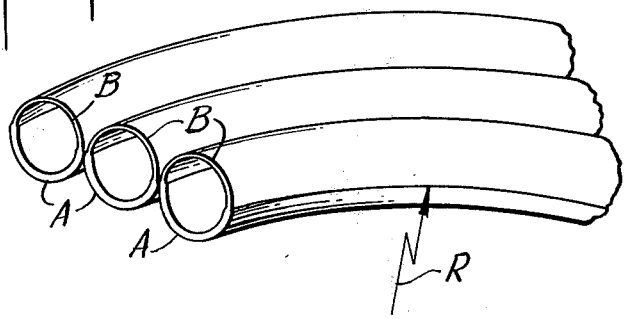
Fig.7.
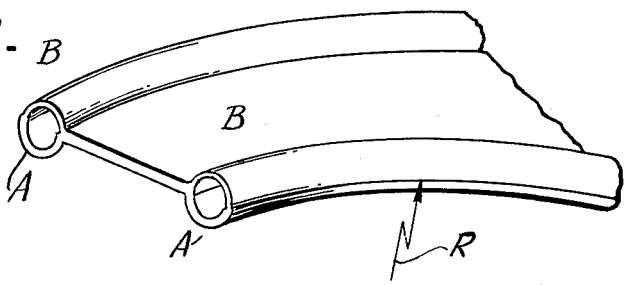

SELF-SHAPING WOVEN INFLATABLE BELT AND METHOD OF PRODUCTION

BACKGROUND OF THE INVENTION

The application of inflatable devices to many uses is quite common in many fields. They are used in buildings and shelters of various types, particularly as brace structures which are erected by inflation with compressed air, or other high pressure fluid. They are also highly useful for their shock absorbing properties, and are thus employed as vehicle bumpers, guard rails and the like. An important recent application of inflatable belts or tubes, as in vehicle passenger passive restraint systems, and particularly in systems employing inflatable safety belts. The safety belt system is of such construction that the belt device is inflated with compressed air to provide a cushioned restraint to the passenger, particularly automatically, under abnormal conditions, and it is highly advantageous that the belt webbing itself be directly inflated with the compressed air. However, when the conventional restraint device of tubular construction is inflated with a pressurized fluid, it is urged to expand or extend into a linearly extending configuration. This tendency is highly undesirable, since in order to optimumly confine and restrain the vehicle passenger, the inflated belt should curve in a manner to conform to and tightly and snuggly engage the body of the passenger in the area of the restraint belt. Moreover, the inflatable belt is of great advantage when formed of a soft, highly flexible fabric, so as to be easily shaped to the contour of the passenger's body.

SUMMARY OF THE INVENTION

It is a principal object of the present invention to provide an improved self-shaping expandable device.

Another object of the present invention is to provide an improved inflatable self-shaping device.

Still another object of the present invention is to provide an elongated tubular web which is inflatable to a load bearing elongated curved configuration and is deflatable to a compactable condition.

A further object of the present invention is to provide an improved inflatable vehicle safety belt which in its deflated condition is soft, strong and highly flexible, and easily wound on a belt retraction reel, and in its inflated condition conforms to and snuggly, tightly, engages the body of the passenger.

Still a further object of the present invention is to provide a device of the above nature characterized by its reliability, ruggedness, low cost and great versatility and adaptability.

The above and other objects of the present invention will become apparent from a reading of the following description taken in conjunction with the accompanying drawings which illustrate preferred embodiments thereof.

In a sense, the present invention contemplates the provision of an improved self-shaping inflatable tubular device, comprising an elongated woven tube, including circumferentially spaced longitudinally extending warps and longitudinally spaced circumferentially extending wefts interweaving said warps and characterized in that first warps along a first side of the tube are shorter than second warps along a second side of the tube whereby the tube is curved along its length in the inflated condition thereof, and upon deflation is collapsible to a substantially flat condition. An improved method for producing the subject device includes weaving a linear tube with the warps on the first side, having a higher heat shrinkage than the warps on the opposite side, and then heating the tube to linearly shrink the warps on the first side to lengths shorter than those on the opposite side.

Advantageously, when the tube is employed as an inflatable vehicle safety belt, the first or shortest warps are of overall greater tensile strength than the opposite warps. Advantageously, each of the first and second sides occupy one half of the tube periphery, and the yarns forming the warps and wefts are continuous synthetic filament yarns. A plurality of similar tubes may be interwoven in side by side relationship, and a pair of transversely spaced tubes may be provided with an interwoven connecting cross web.

The improved inflatable device is of great strength and reliability, of low cost, and high versatility and adaptability.

BRIEF DESCRIPTION OF THE DRAWINGS

FIG. 1 is a fragmentary perspective view of a hollow weave belt embodying the present invention, and shown in an inflated condition;

FIG. 2 is an enlarged fragmentary detailed view of the junction area of the belt high strength base section, and the inflation pressure resistant section of the belt;

FIG. 3 is the weave pattern of the belt base section;

FIG. 4 is the weave pattern of the belt inflation pressure resistant section;

FIGS. 5 *a* to *d* are other examples of weave pattern units at the junction areas;

FIG. 6 is a fragmentary, perspective view of another embodiment of the present invention; and FIG. 7 is a view similar to FIG. 6 of a further embodiment of the present invention.

DESCRIPTION OF THE PREFERRED EMBODIMENTS

Referring now to the drawings, particularly FIGS. 1 to 4 thereof, which illustrate a preferred embodiment of the present invention, the reference letter A generally designates the base portion of the improved belt, the base portion A having a tensile strength and an elongation value to at least meet the standard requirements for vehicle safety belts, as are well known. The base portion A, preferably occupies about one-half the periphery of the belt, but not necessarily, and is approximately, transversely semi-circular when the belt is inflated.

The complementary portion of the belt, that is the opposite semi-circular or residual area or portion of the belt transverse cross section constitutes a pressure resisting portion B of sufficient strength to resist the inflation fluid pressure. Until the pressurized inflating fluid is introduced into the belt, both the base portion A and the pressure resisting portion B assume the shapes of substantially flat bands so as to minimize the volume of the belt upon the winding or other storing or compaction thereof. However, when the inflation fluid or sealing material is introduced into the belt, it assumes a longitudinally arcuate shape with a radius of curvature R to best conform to the body of the seat occupant as shown in FIG. 1. The condition of the belt portions adjacent to the junction P of the base portion A with the pressure resisting portion B is shown in an enlarged scale in FIG. 2. In an example of the present embodiment, a thick yarn, of about 3000 denier and formed of polyester filaments with a relatively high co-efficient of heat shrinkage is employed for the warps 1 to 4 of base portion A, while a finer yarn, for example of about 800 denier with a relatively low co-efficient of heat shrinkage, that is, less than that of warps 1 to 4, is employed for the warps 11 to 14 of pressure resisting portion B. These yarns of two types are interlaced together in different combinations according to their tensile strength, elongation, pressure resistance and curvature. Different filaments or fibers are usually employed for both warps in order to enhance the curvature, but when a relatively low curvature is desired, yarns of the same filament composition, but having different co-efficients of heat shrinkage, may be employed.

In the above example of the present embodiment, the wefts 21 to 24 of base portion A and pressure resisting portion B have a fineness of about 21 to 24 denier, but the usable yarn may be of any type selected from the standpoint of inflation pressure resistance. Furthermore, wefts 21 to 24 may be a single continuous yarn alternately interweaving the base portion A and the pressure resisting portion B. The constructions or weave patterns of the belt textile during the weaving is such that the curvature R changes according to the difference in the textile construction or texture between base portion A and pressure resisting portion B. In the present embodiment, when the textile construction or weave pattern of pressure portion B is a thin compact plain fabric as shown in FIGS. 2 and 4, the texture or weave pattern of base portion A should be a mat weave or a plain weave enlarged in the direction of the warps so that it comprises just a plain weave in which wefts 21, 22 and 23, 24 are associated respectively, while the warps of base portion A is shorter than those of pressure resisting portion B. Such texture of both portions may be prepared by the combination of different weave units such as shown in patterns *a*, *b*, *c* and *d* (*a*, *b*, *c* being mat weaves, and *d* being a twill weave) for the parts of another embodiment of texture in FIG. 5 according to the desired value of the radius of curvature R. Thus a woven hollow-weave belt is provided with a predetermined inflation radius of curvature R and by the subsequent dyeing or heat treatment of the woven belt which is then covered with a thin coating, for example, by a low concentration resin treatment employing a polyurethane resin or the like, so as to render the tubular belt impervious or leakproof under inflation pressures. In the example described above, the heat treatment was effected at a temperature of about 180°C while the radius of curvature was about 2 mm for an inflation pressure 0.6 Kg/cm$^2$ of compressed air.

The improved hollow-weave belt when employed as, for example, a vehicle safety belt, is ordinarily retracted by winding it in the form of a flat band on a reel, and one end of the belt is closed and fixed. When an inflation fluid is introduced, the belt forms a soft tube with a radius of curvature R.

The embodiment of the invention illustrated in FIG. 6 of the drawings differs from that first described in that the belt is formed of a plurality of tubes in joined side-by-side relationship, three tubes being shown by way of example, the tubes being joined be being woven and joined by wefts common to the tubes. Each of the tubes, like the first embodiment, includes a base portion A and a pressure resistant portion B, the portions A and the portions B being on respectively common sides of the belt. The portions A and B of the present embodiment possess similar relative characteristics and properties to those of the first embodiments, and the belt may be produced by a similar method.

In FIG. 7 of the drawings, there is illustrated a further embodiment of the present invention in which a pair of tubes are formed as the longitudinal side selvages of the belt, the tubes being joined along their lengths by a flat cross web which is interwoven with the tubes. The base portion A and the pressure resistant portions of the side selvage tubes are on respectively common opposite sides of the belt and these portions possess similar properties and relationships to those of the earlier described embodiments, and the belt is produced in a like manner.

The improved devices described above are, in a sense, when inflated, curved tubular hollow weave belts having highly suitable softness properties and a greatly desirable rigidity, depending on the type and pressure of the inflation fluid. They are not only employed to great advantage as vehicle safety belts, but also in other applications, such as the industrial fields, including compressed air-braced buildings, shelters and similar structures, and many other systems.

While there have been described and illustrated preferred embodiments of the present invention, it is apparent that numerous alterations, omissions and additions may be made without departing from the spirit thereof.

I claim:

1. A self shaping inflatable tubular device comprising an elongated tube defining hollow woven band, including circumferentially spaced longitudinally extending warps and longitudinally spaced continuously circumferentially extending wefts interweaving said warps, first warps along a first side of said tube being shorter than second warps along an opposite second side of said tube, whereby said tube is curved along its length in the inflated condition thereof, and said tube upon deflation, is collapsible to a substantially flat condition, said hollow woven band having a resin coating to render the walls thereof impervious.

2. The device of claim 1 wherein said first warps are of greater tensile strength than said second warps.

3. The device of claim 1 wherein said first and second sides each extend for approximately one-half of the circumference of said tube.

4. The device of claim 1 wherein said warps are formed of synthetic continuous filament yarns.

5. The device of claim 4 wherein said warps are formed of similar polymeric resins, and said first warps are of greater denier than said second warps.

6. The device of claim 1 comprising a plurality of said tubes in side-by-side interwoven relationship with said first warps being disposed along corresponding common sides of said tubes.

7. The device of claim 1 comprising a pair of said tubes with said first and second warps being on respectively common sides of said tubes, said tubes being transversely spaced and a woven web extending between and joined to said tubes.

* * * * *